United States Patent Office 3,182,049
Patented May 4, 1965

3,182,049
PRODUCTION OF SOLID OLEFIN POLYMERS
Charles W. Moberly, Bartlesville, Okla., assignor to Phillips Petroleum Company, a corporation of Delaware
No Drawing. Filed Apr. 15, 1963, Ser. No. 272,854
16 Claims. (Cl. 260—93.7)

This invention relates to the production of solid olefin polymers. In one aspect, the invention relates to an improved method for preparing from certain selected olefins solid polymers having a high n-heptane insolubles content.

This is a continuation-in-part of the copending application Serial No. 860,324, filed December 18, 1959.

Various reactions for polymerizing olefins are described in the literature, and the polymerizations are usually carried out in the presence of catalysts. One type of catalyst which has been recently disclosed for use in the polymerization of monoolefins, particularly ethylene, consists of an organometal compound, e.g., triethylaluminum, or a dialkylaluminum halide and a heavy metal, e.g., titanium tetrachloride or titanium trihalide. It has been found that when certain olefins, e.g., propylene, are contacted with such a catalyst, a polymer is obtained which is crystalline and which has desirable physical properties such as modulus, hardness, ultimate tensile strength, range of melting temperatures and molding and fiber forming properties. A most important factor having a significant influence on the properties of the polymer has been found to be the content of the polymer which is soluble in aliphatic hydrocarbons. In other words, the greater the percent of the hydrocarbon insoluble material in the polymer the more favorable are the above properties. A frequently employed test method is descibed in Example I and produces a number indicative of the n-heptane insolubles in the polymer. Another hydrocarbon frequently employed is n-pentane which produces a value which is different from the n-heptane test but which is related. The reason for the effect by the insoluble content on these physical properties is not known. However, it has been found that these polymers are characterized by certain regularity of molecular structure. Thus, a polypropylene molecule can be considered as a chain of 2-carbon units with a methyl side group attached to every other carbon atom in the chain. Certain polymers of this type are characterized by the fact that they contain a series of such monomer units in which all of the methyl side groups are oriented in space at the same position or at the same angle with respect to the respective tertiary carbon atoms to which they are attached.

It is an object of this invention, therefore, to provide an improved process for producing polymers having a high aliphatic hydrocarbon insolubility content.

Another object of the invention is to provide a process for preparing polymers having n-heptane insolubles contents which are higher than those of conventionally prepared polymers.

A further object of the invention is to provide a process in which increased yields of polymers are obtained which have a high n-heptane insolubility content.

Other and further objects and advantages of the invention will become apparent to those skilled in the art upon consideration of the accompanying disclosure.

The present invention resides in the discovery that certain olefin polymers having a very high content of aliphatic hydrocarbon insolubles can be prepared if the polymerization is carried out in the presence of a catalyst adjuvant comprising a halogen-containing salt of a heterocyclic nitrogen compound. Broadly speaking, in a process in which an olefin corresponding to the formula

R—CH=CH$_2$ wherein R is an alkyl radical containing from 1 to 4 carbon atoms, is polymerized in the presence of a catalyst prepared by admixing (a) a metal, a metal hydride or organometal compound of a metal of Groups I, II or III of the Periodic System and (b) a compound of a metal of Groups IV, V, VI or VIII of the Periodic System, the instant invention resides in the improvement of conducting the polymerization in the presence of a heterocyclic compound which can be represented by one of the following structural formulae:

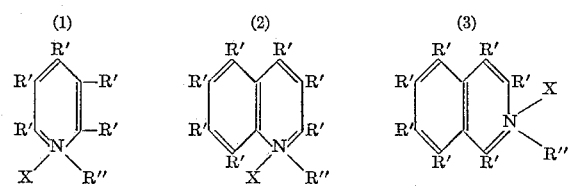

wherein R′ is hydrogen or an alkyl radical containing up to and including 6 carbon atoms; R″ is an alkyl, cycloalkyl or aryl radical containing up to and including 20 carbon atoms; and X is a halogen. Halogen atoms which can be included as X in the above formulae include chlorine, bromine and iodine. As regards the R′ alkyl radicals attached to the rings, it is preferred that the compounds contain not more than an average of 3 alkyl radicals per ring. It is to be understood also that R″ can be a combination of hydrocarbon radicals, e.g., alkaryl or aralkyl. When proceeding in accordance with the present invention, it has been found that polymers having n-heptane insolubles contents in the range of 85 to 96 percent and higher can be readily prepared. In comparison, if the polymerization is conducted in the absence of the adjuvant of this invention with a catalyst prepared by admixing, e.g., titanium trichloride and triethyl-aluminum, the n-heptane insolubles content of the polymer is usually around 80 percent. Furthermore, it has been found that the addition of the adjuvant material of this invention to catalyst systems which normally produce polymers of very low n-heptane insoluble contents results in a substantial increase in the n-heptane insoluble content of the product produced. For example, when using a catalyst system consisting of titanium tetrachloride and a trialkylaluminum, such as triisobutylaluminum, to polymerize propylene, a polymer having an n-heptane insoluble content of about 20 percent is generally obtained. By incorporating a heterocyclic nitrogen compound as defined above in such a catalyst system, it has been found that the n-heptane insoluble content of the product produced can be increased to 50 percent or higher. The reason for the unexpected improvement obtained when utilizing the heterocyclic nitrogen compounds in the process of this invention is not completely understood. However, it is apparent that the additive materials act to modify the action of the catalyst system so that the polymer product is one having a high n-heptane insoluble content. In general, the addition of the heterocyclic nitrogen compounds to the polymerization system as herein described makes it possible to obtain a polymer product having a higher aliphatic hydrocarbon insoluble content than that obtainable in the absence of such compounds.

The olefins which are polymerized in accordance with present process correspond to the formula

R—CH=CH$_2$ wherein R is selected from the group consisting of an alkyl radical containing from 1 to 4, inclusive, carbon atoms. Examples of suitable olefins include propylene, 1-butene, 1-pentene, 2-methyl-1-butene, 2-methyl-1-pentene, 4-methyl-1-pentene, 3,3-dimethyl-1-butene, and the like. It is often preferred to utilize propylene as the monomer.

The term "polymer" includes both homopolymers and copolymers of the above monomers as well as materials copolymerizable therewith. Suitable copolymers include copolymers of propylene and butene-1, ethylene and propylene, and 4-methyl-1-pentene and propylene and/or ethylene.

Whenever the catalyst system produces a polymer having at least a portion which is insoluble in n-heptane under the conditions described herein, the adjuvant of the invention will increase the n-heptane insolubility content of the polymer. The polymerization process of this invention is conducted in the presence of a catalyst system prepared by admixing at least two components wherein one component is an organometal compound, including compounds where one or more, but not all, organo groups are replaced by halogen, a metal hydride, or a metal of Groups I, II or III, and the second component is a Group IV, V, VI or VIII (Mendeleeff's Periodic System) metal compound. The organometal compounds referred to include, without limitation, alkyl, cycloalkyl or aryl compounds of mono-, di-, tri-, or tetravalent metals, particularly aluminum, gallium, indium, beryllium, sodium, potassium, lithium, rubidium, cesium, magnesium, cadmium, mercury, zinc, barium, or such organometal compounds where one or more but not all of the alkyl, cycloalkyl, or aryl groups is replaced by a hydrogen atom and/or a halogen atom. The organo groups can be quite large, compounds being applicable which have 15 or more carbon atoms in each alkyl, cycloalkyl or aryl group, and 40 carbon atoms or more in the molecule. Specific examples of such organometal compounds include trimethylaluminum, triethylaluminum, triisobutylaluminum, a mixture of diethylaluminum chloride and ethylaluminum dichloride (sometimes referred to as ethylaluminum sesquichloride), diethylaluminum hydride, ethylaluminum dichloride, diethylaluminum chloride, trioctylaluminum, tridodecylaluminum, triphenylaluminum, triphenylgallium, diphenylberyllium, dicyclohexylberyllium, cyclohexylzinc fluoride, and $CH_3AlCl_2$, $(CH_3)_2AlCl$, $(C_4H_9)_2AlBr$, $C_8H_{17}A_2$, $(C_3H_7)_2GaF$, $(C_6H_{11})_2GaCl$ (cyclohexane derivative), $C_6H_5GaBr_2$, $C_{20}H_{41}GaBr_2$, $(C_{14}H_{29})_2GaF$, $(C_6H_5)_2InCl$, $C_8H_{17}InF_2$, $C_6H_{11}InBr_2$ (cyclohexane derivative), $C_{17}H_{35}BeI$, $CH_3BeBr$, and the like. In shorthand form these organometal compounds can be described as compounds having the formula $R_nMX_m$ where R is selected from the group consisting of alkyl, cycloalkyl, aryl radicals and combinations thereof, X is selected from the group consisting of hydrogen and halogen, M is a metal selected from the group consisting of metals of Groups I, II or III, $n$ is from 1 to 3, inclusive, $m$ is from 0 to 2, inclusive, and the sum of $m$ and $n$ is equal to the valence of metal M.

The metal hydrides can include, as specific examples, aluminum hydride, lithium aluminum hydride, barium hydride, gallium hydride, indium hydride, sodium aluminum hydride, and potassium beryllium hydride.

The metals of Groups I, II and III are applicable as a class, the most important members being sodium, magnesium and aluminum.

The compounds of the metals of Groups IV, VI, V and VIII of the Periodic System include the oxides, hydrides, halides, oxyhalides, and salts of organic acids, usually having 20 or less carbon atoms, such as formic acid, caprylic acid, lauric acid, palmitic acid, and arachidic acid. It is usually preferred to employ compounds of elements of Group IV-A, V-A, VI-A or VIII, for example titanium, zirconium, hafnium, chromium, thorium, molybdenum, vanadium, niobium, tantalum and iridium. Of the various compounds, it is generally preferred to employ the titanium halids, including the chlorides, fluorides, bromides and iodides, particularly the tri- and tetrachlorides, the tri- and tetrabromides, and the tri- and tetraiodides of titanium.

A third catalyst component which can be advantageously used is an organic halide or metal halide where the organic radical has 30 or less carbon atoms and is an alkyl, cycloalkyl or aryl group. Specific examples include ethyl bromide, ethyl trichloro titanium, bromobenzene, cyclohexyl chloride, and the like. Also applicable as third catalyst components are the alkali metal and ammonium halides, and aluminum halides (where the catalyst also includes another metal compound such as a titanium compound), a halogen, a hydrogen halide, an organophosphorus-containing compound, and a peroxide.

Examples of suitable catalyst systems in accordance with the foregoing disclosure are as follows:

(a) Aluminum trialkyls, e.g., triethylaluminum or triisobutylaluminum, and the tri- or tetravalent metal halides of Groups IV-A and V-A of the type represented by the tri- and tetrachlorides, the tri- and tetraiodides and the tri- and tetrabromides of titanium, zirconium, hafnium, vanadium, niobium, and tantalum;

(b) An organic halide, such as ethyl bromide, a Group IV inorganic halide, such as titanium tetrachloride, and a low valence metal selected from the group consisting of alkali metals, beryllium, magnesium, zinc, cadmium, mercury, aluminum, gallium, indium and thallium, for example, magnesium ethyl bromide and titanium tetrachloride, as such, or with the addition of metallic aluminum;

(c) A Group IV metal halide, for example, titanium tetrachloride, and a metal identified in (b), for example, sodium, aluminum or magnesium;

(d) A mixture of titanium hydride and an organometal compound exemplified by an aluminum alkyl halide, i.e., a mixture of titanium hydride and ethylaluminum sesquichloride;

(e) Titanium dioxide and an organometal compound such as trialkylaluminum or aluminum alkyl chlorides, e.g., a mixture of titanium dioxide and ethylaluminum sesquichloride;

(f) A mixture of molybdenum pentachloride and organometal compounds exemplified by triisobutylaluminum or triethylaluminum and ethylaluminum dichloride;

(g) A mixture of complex metal halides, exemplified by potassium fluotitanate, and an organometal compound exemplified by triethylaluminum and diethylaluminum chloride;

(h) A mixture of a derivative selected from the oxides of molybdenum, alkali metal and ammonium molybdate, and an organometal compound exemplified by triisobutylaluminum and isobutylaluminum dichloride;

(i) A mixture of a derivative of iridium, platinum, and osmium, selected from the group consisting of halides or oxides, and complex compounds of iridium, platinum and osmium, the complex compounds corresponding to the formula $M_xM'X_y$, wherein M is an alkali metal or an ammonium radical, M' is iridium, platinum or osmium, X is a halogen, and $y$ is at least one and the sum of $x$ and $y$ is equal to the valence of M', and a metallic organic compound exemplified by triethylaluminum, for example, iridium chloride and triethylaluminum or ethylaluminum sesquichloride;

(j) At least one derivative selected from the group consisting of oxides, halides, and oxyhalides of vanadium and complex salts of said halides with a member selected from the group consisting of ammonium halide and an alkali metal halide, and an organometal compound exemplified by triethylaluminum, for example, vanadium oxide or vanadium chloride and triethylaluminum;

(k) A mixture of a derivative of a Group VI metal selected from the group consisting of halides, oxyhalides, hydroxyhalides, oxyhydroxyhalides of a metal selected from the group consisting of molybdenum, tungsten, uranium, selenium, tellurium, and polonium, and complex salts of said halides and said oxyhalides with a member selected from the group consisting of halides of sodium, potassium, lithium, rubidium, cesium, and ammonia and an organometal compound exemplified by triethylaluminum, for example, molybdenum pentachloride and ethylaluminum dichloride;

(*l*) A chromyl halide and at least one of the following (1) a metal hydride or an organometal compound, and (2) a mixture of an organic halide and a metal, for example, chromyl chloride, ethyl bromide and magnesium;

(*m*) At least one halide of titanium, zirconium or hafnium, and at least one hydride of lithium, sodium, potassium, rubidium, cesium, magnesium, calcium, strontium, barium, lanthanum, or thorium, for example, zirconium tetrachloride and calcium hydride;

(*n*) (1) A hydrocarbon derivative of one of the metals zinc, cadmium, mercury, and magnesium, and (2) a member selected from the group consisting of halides of titanium, zirconium, vanadium and molybdenum, oxyhalides of titanium, zirconium, vanadium, molybdenum and chromium, and complex salts of said halides and oxyhalides with a member selected from the group consisting of halides of the alkali metals and ammonia, for example, diethylzinc and titanium tetrachloride;

(*o*) (1) A tri- or tetrahalide of titanium, zirconium, hafnium and germanium, (2) an organophosphorus-containing compound, and (3) at least one of the following, (*a*) an organometal compound, (*b*) a mixture of an organic halide and a metal, and (*c*) a complex hydride, for example, ethylaluminum sesquichloride, titanium tetrachloride and triphenylphosphine;

(*p*) (1) A tri- or tetrahalide of titanium, zirconium, hafnium or germanium, (2) a peroxide of the formula R″OOR″ wherein R″ is hydrogen, alkyl, aralkyl, alkaryl, cycloalkyl, acyl, alkynyl, or aryl, and (3) at least one of the following: (*a*) an organometal compound, (*b*) a mixture of an organic halide and a metal, and (*c*) a complex hydride, for example, ethylaluminum sesquichloride, titanium tetrachloride and benzoyl peroxide;

(*q*) (1) A halide of titanium, zirconium, hafnium, or germanium, (2) a hydride selected from the group consisting of hydrides of aluminum, gallium, indium, and thallium, and complexes of said hydrides with alkali metal hydrides, and (3) an organic halide, for example, titanium tetrachloride, lithium aluminum hydride and ethyl bromide.

The invention is particularly advantageous when the adjuvant is employed in conjunction with an initator system prepared by admixing an alkyl aluminum and a titanium trihalide, for example, a trialkylaluminum or a dialkylaluminum halide plus a titanium trihalide, such as titanium trichloride.

The preferred initiator system, particularly in the mass polymerization of propylene, is prepared by admixing a dialkylaluminum halide, preferably a dialkylaluminum chloride, e.g., diethylaluminum chloride, and the reaction product of titanium tetrachloride and aluminum, said reaction product having the approximate formula $$3TiCl_3 \cdot AlCl_3$$

The compounds used as adjuvants of this invention are heterocyclic nitrogen compounds having in their molecular configuration a 6-member cyclic structure, one member of which is a nitrogen atom. Examples of compounds which can be used include 1-ethylpyridinium chloride, 1-cyclohexylquinolinium chloride, 1-methylquinolinium chloride, 2-(2-naphthyl)isoquinolinium chloride, 1-ethylquinolinium iodide, 1-methylpyridinium iodide, 1-ethylpyridinium bromide, 1-propylquinolinium chloride, 2-butylisoquinolinium chloride, 1-(4-phenylbutyl)-2,6-di-n-propylpyridinium iodide, 1-isobutyl-2,3,6,7-tetramethylquinolinium chloride, 2-methyl-3,5,7-tri-n-butylisoquinolinium chloride, 1-(6-cyclohexyloctyl)-5,8-diethylquinolinium bromide, 1 - eicosyl - 2,4,6 - tri-n-hexylpyridinium chloride, 1-cyclohexyl-3,5-dibutylpyridinium bromide, 1-phenyl - 2,3,5,6,7,8 - hexaethylquinolinium iodide, 1 - (3 - decylcyclohexyl)-2,3,6-tripropylquinolinium chloride, 2-tert-dodecyl-1,4,7-tri-sec-octylisoquinolinium bromide, 1-n-butyl-2,3,5-triisopropylpyridinium chloride, 1-methyl-4-amylpyridinium bromide, 1-sec-hexyl-2,5-di-tert-butylpyridinium chloride, 1-methyl-2-propylquinolinium chloride, 1-tert-amyl-4-tert-hexylquinolinium chloride, 1-ethyl-6-n-heptylquinolinium bromide, 2-(4-tetradecylphenyl)-isoquinolinium chloride, and 2 - (2-ethylhexyl) - 1,4,7,8 - tetra(3-methylamyl)-isoquinolinium bromide.

The ratio of the catalyst components employed in the present process can be varied rather widely, depending upon the particular monomer used and the operating conditions. The mol ratio of the organometal compound, metal hydride or Groups I, II or III metal to the Group IV, V, VI, or VIII metal compound is usually in the range of 1:1 and 10:1 with a preferred range being 2:1 and 5:1. The concentration of catalyst in the polymerization zone is usually in the range of 0.01 to 5 weight percent, based on the monomer charged to that zone, although lesser or greater amounts can be used. The adjuvants of the invention are incorporated in the catalyst composition in a ratio of 0.01 to 4.0 mols per mol of the Group IV, V, VI or VIII metal compound. Addition of the additive material can be made at any point in the preparation of the catalyst. A convenient method of operation is to add the adjuvant along with the diluent in the initial charge to the reactor.

The polymerization of the 1-olefin with the catalyst and adjuvant of the invention can be conducted by any suitable means such as a solution process or the mass procedure and under conditions well known to those skilled in the art. As is well known to those skilled in the art, the polymerization of the alpha-olefins may be conducted in the presence of a hydrocarbon diluent which is inert and liquid under the conditions of the process and does not have a deleterious effect on the catalyst. Suitable diluents include paraffinic, cycloparaffinic, and/or aromatic hydrocarbons. Examples of such diluents include propane, butane, pentane, hexane, cyclohexane, methylcyclohexane, benzene, toluene, the xylenes, and the like. The relative amounts of diluent and olefin employed in the polymerization depend upon the particular conditions or techniques used and are generally governed by the capacity of the apparatus to effect suitable agitation and heat removal. The polymerization can be carried out at a temperature varying over a rather broad range, for example, at a temperature of —100 to 500° F. In general, pressures are satisfactory which are sufficient to maintain the reaction mixture substantially in the liquid phase.

Although the invention is not limited thereby, one particularly preferred method is the so-called mass polymerization system wherein the monomer, preferably the propylene, is liquefied and contacted in the reaction zone with a two or more component initiator system discussed hereinbefore, preferably in the presence of hydrogen. When employing propylene as the monomer and diluent, a suitable temperature is in the range of about 0 to 250° F.

The process of the invention can be carried out as a batch process, e.g., by pressuring the olefin to be polymerized into a reactor containing a catalyst system, the adjuvant and the diluent. Furthermore, the process can be carried out continuously by maintaining the reactants in the reactor for a suitable residence time. The residence time employed in the continuous process can vary widely since it depends to a great extent upon the temperature and the specific olefin. However, the residence time in a continuous process generally falls within the range of 1 second to 5 hours or more. In a batch process, the reaction time can also vary widely, such as from 15 minutes up to 24 hours or more.

It has been found that various materials in some instances may have a tendency to inactivate the catalyst composition of this invention. These materials include carbon dioxide, oxygen and water. Accordingly, it is usually desirable to free the olefins to be polymerized from these materials as well as from other materials which may tend to inactivate the catalyst before contacting the olefin with the catalyst. Any of the known means for removing such contaminants can be employed. Furthermore, the hydrocarbon diluent employed in the process is preferably freed of contaminants, such as water, oxygen and the like. It is desirable also that air and moisture be removed from the reaction vessel before the reaction is carried out. This is usually accomplished by purging with an inert gas such as nitrogen. In some cases, small amounts of catalyst inactivating materials, such as oxygen and water, can be tolerated in the reaction mixture while still obtaining reasonably good polymerization rates. However, it is to be understood that the amount of such materials present in the reaction mixture shall not be sufficient to completely inactivate the catalyst.

The treatment of the polymerizate subsequent to the polymerization step depends upon the type of process employed for the polymerization. For example in a solution process upon completion of the polymerization, by one suitable method, any excess olefin is vented and the contents of the reactor are treated so as to inactivate the catalyst and remove the catalyst residue. The polymer is then precipitated and separated from the diluent by decantation, filtration or other suitable method, after which the polymer is dried.

In one suitable method in the mass polymerization process, the polymerizate from the reactor is charged to a suitable vessel and the catalyst residue is removed by contact with an extractant, such as a diketone, e.g., acetylacetone, in the presence of propylene oxide. Prior to the discovery of the adjuvant herein it was generally necessary to wash the effluent with an extractant for the amorphous polymer, such as propylene, propane, or other hydrocarbon mixtures thereof, at a temperature preferably less than 80° F. After separation the polymer is dried.

One of the advantages of the invention is that a polymer having a low amorphous content is produced. Although the amorphous materials are generally soluble in hydrocarbons and can thus be removed by extraction, such procedures are time and labor consuming and require extensive and costly additional equipment. Thus, a satisfactory method for the prevention of their formation during polymerization constitutes a significant contribution to the art.

The designations for the periodic system classification utilized in the present specification and claims are in accordance with the Periodic Classification on page 28 of the book "Inorganic Chemistry," by P. C. L. Thorne and A. M. Ward (third English edition), published by Gurney and Jackson, London, England, 1939.

A more complete understanding of the invention can be obtained by referring to the following illustrative examples which are not intended, however, to be unduly limitative of the invention.

Although the improvement shown herein is described in terms of "n-heptane insolubility content" determined as described hereinafter in Example I, this pentene-soluble content may be determined as described in Example II.

EXAMPLE I

A series of runs was carried out in which the following procedure was followed in polymerizing propylene. A 1-gallon stainless steel reactor was charged with 1 liter of cyclohexane, the reactor being purged with nitrogen prior to and during the charging procedure. To this system there was added a weighed amount of titanium trichloride and the catalyst adjuvant. The reactor was then closed and flushed twice with nitrogen at 100 p.s.i.g. There was then added through the charging tube 500 ml. of cyclohexane in which a weighed amount of triethylaluminum was dissolved, this charge being followed by an additional 500 ml. of cyclohexane as a rinse. The reactor was then flushed twice with propylene at 100 p.s.i.g. after which 0.6 pound of propylene was charged. The temperature was raised to 225° F. and maintained between this temperature and 260° F. for the duration of the run. After about 1.5 hours, additional propylene was introduced to maintain a pressure of about 150 p.s.i.g. At the end of 2.5 hours, the propylene was shut off, and the reactor was allowed to cool overnight.

The contents of the reactor were removed and washed in a Waring Blendor, flushed with about 3 liters of isopropanol, and then again flushed with an equal amount of methanol. Thereafter, the polymer was recovered, sprayed with about 0.1 percent Ionol (2,4-di-t-butyl-3-methylphenol) and dried overnight at 80° C. in a vacuum oven.

The n-heptane insolubles content of each product was determined by placing 2.5±0.1 grams of polymer in a weighed extraction thimble and extracting in an ASTM Rubber Extraction Apparatus for 2.5 hours with 100 ml. of normal heptane. The thimble was then removed and dried in a forced air oven at 110° C. for 2 hours, after which it was cooled in a desiccator and weighed. The weight percent of residue, based on original polymer, was calculated and recorded as the n-heptane insolubles content. Data for these runs are set forth hereinbelow in the table. Included in the table are data for control runs which were carried out in the absence of the catalyst adjuvant of this invention.

*Table I*

| Run No. | 1 | 2 | 3 | 4 | 5 |
|---|---|---|---|---|---|
| TEA, gm | 1.35 | 1.44 | 1.26 | 1.31 | 1.52 |
| TiCl₃, gm | 0.615 | 0.657 | 0.574 | 0.594 | 0.689 |
| Adjuvant | ¹ EPBr | ¹ EPBr | ² MQCl | None | None |
| Adjuvant, gm | 0.376 | 0.100 | 0.084 | | |
| Ratio, TEA/TiCl₃/Adj.³ | 3/1/0.5 | 3/1/0.125 | 3/1/0.125 | 3/1/0.0 | 3/1/0.0 |
| Yield, gm | 40 | 280 | 198 | 435 | 531 |
| Productivity, gm./gm. cat. | 22 | 133 | 108 | 228 | 240 |
| n-Heptane insolubles | 86.5 | 89.0 | 90.0 | 80.5 | 80.0 |

¹ 1-ethylpyridinium bromide.
² 1-methylquinolinium chloride.
³ Mol ratio.

From a consideration of the data in the foregoing table, it is seen that in Runs 1, 2 and 3 conducted according to the present invention, polypropylene products were obtained which had n-heptane insoluble contents ranging from 86.5 to 90 percent. These runs are to be compared with control Runs 4 and 5 in which the products had an n-heptane insoluble content of only about 80 percent.

The polymers produced in accordance with this invention have utility in applications where solid plastics are used. They can be molded to form articles of any desired shape such as bottles or other types of containers. Furthermore, they can be formed into sheets, film or pipe by extrusion or other suitable method.

EXAMPLE II

The efficacy of 1-ethylquinolinium iodide for the reduction of n-heptane insoluble content in polypropylene prepared in a solution process was determined in a manner similar to that of Example I. A 1-liter stainless-steel stirred reactor was charged with 400 ml. of cyclohexane. To this system was added weighed amounts of TiCl₃ made by hydrogen reduction, adjuvant, and triethylaluminum which was dissolved in a small amount of cyclohexane. After flushing with nitrogen and then propylene the reactor was charged with propylene to maintain a nominal pressure of 100 p.s.i.g. The reaction temperature was maintained for two hours and the reactor was then permitted to cool. Polymerization conditions were as follows:

*Table II*

| Run No. | 1 | 2 |
|---|---|---|
| TiCl₃, gm | 0.091 | 0.109 |
| Et₃Al, gm | 0.203 | 0.242 |
| 1-ethylquinolinium iodide, gm | None | 0.0463 |
| Temperature, °F | 222–250 | 225–255 |
| Pressure, p.s.i.g | 75–140 | 70–130 |

The reaction products were removed, washed in a Waring Blendor with isopropanol and with methanol, filtered and sprayed with 0.3 percent each of dilaurylthiodipropionate and a substituted triazine antioxidant prior to drying in a vacuum oven at 150° F.

The results are summarized in Table IV in Example III as Runs 1 and 2 respectively.

EXAMPLE III

A series of runs was made in which propylene was polymerized in a mass system in the presence of hydrogen and a catalyst system prepared by admixing diethylaluminum chloride and the reaction product of $TiCl_4$ and aluminum, said reaction product having the approximate formula $3TiCl_3 \cdot AlCl_3$. Various adjuvants of the invention were employed. In these runs a 1-liter stainless-steel stirred reactor was first purged with dry propylene, then charged with said $3TiCl_3 \cdot AlCl_3$ followed by the addition of diethylaluminum chloride dissolved in a small amount of cyclohexane. The adjuvant was then added to the reactor separately. The reaction was conducted at 130° F. for 2.5 hours. The polymerization conditions were as follows:

Table III

| Run No. | 3 | 4 | 5 | 6 |
|---|---|---|---|---|
| $3TiCl_3 \cdot AlCl_3$, gms | 0.108 | 0.098 | 0.099 | 0.096 |
| Diethylaluminum chloride, gms | 0.252 | 0.230 | 0.232 | 0.224 |
| 1-ethylquinolinium iodide, gms | | | 0.046 | |
| 1-methylquinolinium chloride, gms | | | 0.0292 | |
| 1-ethylpyridinium bromide, gms | | | | 0.030 |
| Hydrogen, liters | 1.0 | 1.0 | 1.0 | 1.0 |
| Propylene, grams | 150 | 150 | 150 | 150 |

The reaction products were then removed, soaked in methanol overnight and sprayed with dilaurylthiodipropionate and a substituted triazine antioxidant prior to drying in a vacuum oven at 150° F.

The resultant polypropylene was evaluated as follows:

Table IV

| Run No. | 1[1] | 2[1] | 3 | 4 | 5 | 6 |
|---|---|---|---|---|---|---|
| Heptane Insolubles, percent [2] | 71.9 | 84.4 | 90.9 | 95.8 | 92.6 | 92.9 |
| Melt Index [3] | 0.27 | 0.27 | 6.51 | 0.76 | 3.95 | 1.09 |
| Density, gm./cc. [4] | 0.903 | 0.908 | 0.907 | 0.908 | 0.907 | 0.908 |
| Flexural modulus, p.s.i.×10⁻³ [5] | 112 | 151 | 185 | 203 | 201 | 176 |
| Shore D Hardness [6] | 71 | 74 | 75 | 77 | 76 | 75 |
| Tensile yield, p.s.i. [7] | 2,937 | 3,583 | 4,217 | 4,580 | 4,393 | 4,083 |
| Elongation at break, percent [7] | 30 | >100 | 16 | >100 | 16 | >100 |

[1] From Example II.
[2] Determined as described in Example I.
[3] ASTM D-1238-57T, Condition E, 230° C.
[4] ASTM D-1505-60T.
[5] ASTM D-790-61.
[6] ASTM D-1706-61.
[7] ASTM D-638-61T.

These runs demonstrate that not only are the adjuvants of the invention effective for solution polymerization systems but also for mass polymerization. In addition, although the DEAC-$3TiCl_3 \cdot AlCl_3$ catalyst system produces a polymer having a low amount of n-heptane soluble components, even these can be substantially reduced by these adjuvants.

EXAMPLE IV

A series of runs is made in which 150 grams of propylene is polymerized in a mass system in the presence of one liter of hydrogen, 0.25 gram of catalyst component A (see Table V), 0.10 gram of catalyst component B, and 0.10 gram of the indicated adjuvant. These runs are made in the same manner and under the same conditions as those reported in Example III, and the reaction products are also treated in the same manner.

Table V

CATALYST COMPONENTS AND ADJUVANTS

| Run No. | Component A | Component B | Adjuvant |
|---|---|---|---|
| 1 | Methylaluminum dichloride. | $TiCl_3$ | Ethylpyridinium chloride. |
| 2 | Triisobutylaluminum. | Complex [1] | Methylpyridinium iodide. |
| 3 | Ethylaluminum sesquichloride. | $TiCl_3$ | Propylquinolinium chloride. |
| 4 | Trioctylaluminum | Complex | Butylisoquinolinium chloride. |
| 5 | Tricyclohexylaluminum. | $TiCl_3$ | 1-cyclohexyl-3,5-dibutylpyridinium bromide. |
| 6 | Diphenylaluminum bromide. | $TiCl_3$ | Ethylquinolinium iodide. |
| 7 | Phenyl(dodecyl)-aluminum iodide. | Complex | Ethylpyridinium bromide. |

[1] "Complex" refers to the reaction product of titanium tetrachloride and aluminum having the approximate formula $AlCl_3 \cdot 3TiCl_3$.

The heptane insolubles content of the polymers produced in these runs is substantially higher than that of the control polymer (Run 1, Table IV).

It will be apparent to those skilled in the art that many variations and modifications of the invention can be practiced upon study of the foregoing disclosure. Such variations and modifications are believed to come within the spirit and scope of the invention.

I claim:

1. In a process for polymerizing an olefin in the presence of a catalyst prepared by admixing at least two essential components, one of said components being a compound selected from the group consisting of halides of metals of Group IV–A, V–A, VI–A or VIII, and an admixture of aluminum with a halide of a metal of Group IV–A, V–A, VI–A or VIII, the other of said components having the formula $R_nMX_m$ where R is selected from the group consisting of alkyl, cycloalkyl, aryl radicals and combinations thereof, X is selected from the group consisting of hydrogen and halogens, M is a Group III metal, $n$ is from 1 to 3, inclusive, $m$ is from 0 to 2, inclusive, and the sum of $m$ and $n$ is equal to the valance of metal M, the improvement which comprises contacting said catalyst with an olefin corresponding to the formula $R-CH=CH_2$, wherein R is selected from the group consisting of alkyl radicals containing from 1 to 4, inclusive, carbon atoms, said contacting occurring in the presence of a heterocyclic nitrogen compound selected from the group consisting of compounds having the following structural formulae:

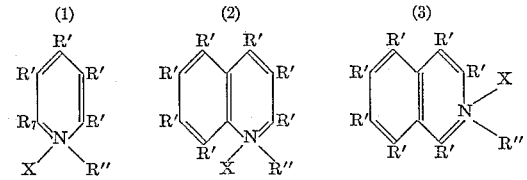

wherein R' is selected from the group consisting of hydrogen and alkyl radicals containing up to and including 6 carbon atoms; R'' is selected from the group consisting of alkyl, cycloalkyl and aryl radicals containing up to and including 20 carbon atoms; and X is a halogen.

2. In a process for polymerizing propylene in the presence of a catalyst prepared by admixing at least two essential components, one of said components being a compound selected from the group consisting of halides of metals of Group IV–A, V–A, VI–A or VIII, and an admixture of aluminum with a halide of a metal of Group IV–A, V–A, VI–A or VIII, the other of said components having the formula $R_nMX_m$ where R is selected from the group consisting of alkyl, cycloalkyl, aryl radicals and combinations thereof, X is selected from the group consisting of hydrogen and halogen, M is a Group III metal, $n$ is from 1 to 3, inclusive, $m$ is from 0 to 2, inclusive, and the sum of $m$ and $n$ is equal to the valence of metal M, the improvement which comprises contacting said catalyst with propylene in the presence of a heterocyclic nitrogen compound selected from the group consisting of compounds having the following structural formulae:

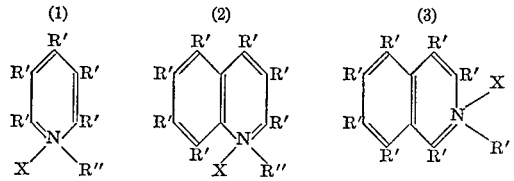

wherein R' is selected from the group consisting of hydrogen and alkyl radicals containing up to and including 6 carbon atoms; R'' is selected from the group consisting of alkyl, cycloalkyl and aryl radicals containing up to and including 20 carbon atoms; X is a halogen, and in the substantial absence of a hydrocarbon diluent other than propylene at a temperature in the range of −100 to 500° F. and at a pressure sufficient to maintain said propylene in the liquid phase; and recovering the solid olefin polymer so produced.

3. A process according to claim 2 wherein the amount of said adjuvant compound is in the range of 0.01 to 4.0 mols per mol of said one of said components contained in said catalyst.

4. In a process for polymerizing an olefin corresponding to the formula R—CH=CH$_2$, wherein R is selected from the group consisting of alkyl radicals containing from 1 to 4, inclusive, carbon atoms, in which said olefin is contacted with a catalyst consisting essentially of a system prepared by mixing a trialkyl aluminum and a titanium trihalide, the improvement which comprises conducting said contacting in the presence of an adjuvant selected from the group consisting of compounds having the following structural formulae:

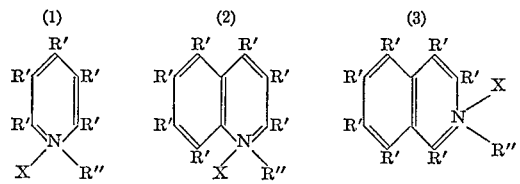

wherein R' is selected from the group consisting of hydrogen and alkyl radicals containing up to and including 6 carbon atoms; R'' is selected from the group consisting of alkyl, cycloalkyl and aryl radicals containing up to and including 20 carbon atoms; and X is a halogen.

5. In a process for polymerizing propylene in which said propylene is contacted with a catalyst consisting essentially of a system prepared by mixing a trialkyl aluminum and a titanium trihalide in the presence of a hydrocarbon diluent at a temperature in the range of −100 to 500° F. and at a pressure in the range 50 to 1500 p.s.i.g. the improvement comprising conducting said contacting in the presence of an adjuvant selected from the group consisting of compounds having the following structural formulae:

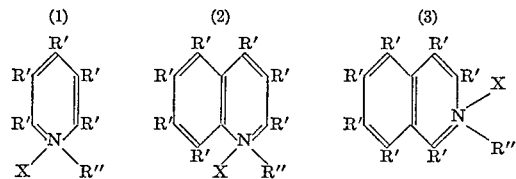

wherein R' is selected from the group consisting of hydrogen and alkyl radicals containing up to and including 6 carbon atoms; R'' is selected from the group consisting of alkyl, cycloalkyl and aryl radicals containing up to and including 20 carbon atoms; and X is a halogen.

6. In a process for polymerizing propylene in which said propylene is contacted with a catalyst consisting essentially of a system prepared by mixing triethylaluminum and titanium trichloride in the presence of a hydrocarbon diluent at a temperature in the range of −100 to 500° F. and at a pressure in the range 50 to 1500 p.s.i.g. the improvement comprising conducting said contacting in the presence of an adjuvant consisting of ethylpyridinium bromide.

7. In a process for polymerizing propylene in which said propylene is contacted with a catalyst consisting essentially of a system prepared by mixing triethylaluminum and titanium trichloride in the presence of a hydrocarbon diluent at a temperature in the range of −100 to 500° F. and at a pressure in the range 50 to 1500 p.s.i.g. the improvement comprising conducting said contacting in the presence of an adjuvant consisting of methylquinolinium chloride.

8. In a process for polymerizing propylene in which said propylene is contacted with a catalyst consisting essentially of a system prepared by mixing a triisobutylaluminum and titanium tetrachloride in the presence of a hydrocarbon diluent at a temperature in the range of −100 to 500° F. and at a pressure in the range 50 to 1500 p.s.i.g. the improvement comprising conducting said contacting in the presence of an adjuvant consisting of ethylpyridinium bromide.

9. In a process for polymerizing propylene in which said propylene is contacted with a catalyst consisting essentially of a system prepared by mixing a triisobutylaluminum and titanium tetrachloride in the presence of a hydrocarbon diluent at a temperature in the range of −100 to 500° F. and at a pressure in the range 50 to 1500 p.s.i.g. the improvement comprising conducting said contacting in the presence of an adjuvant consisting of methylquinolinium chloride.

10. In a process for polymerizing propylene in which said propylene is contacted with a catalyst consisting essentially of a system prepared by mixing triethylaluminum and titanium trichloride in the presence of a hydrocarbon diluent at a temperature in the range of −100 to 500° F. and at a pressure in the range 50 to 1500 p.s.i.g. the improvement comprising conducting said contacting in the presence of an adjuvant consisting of ethylquinolinium iodide.

11. In a process for polymerizing an olefin corresponding to the formula R—CH=CH$_2$, wherein R is selected from the group consisting of alkyl radicals containing from 1 to 4, inclusive, carbon atoms, in which said olefin is contacted with a catalyst prepared by admixing an alkylaluminum halide and a titanium trihalide the improvement comprising conducting said contacting in the presence of a heterocyclic nitrogen compound selected from the group consisting of compounds having the following structural formulae:

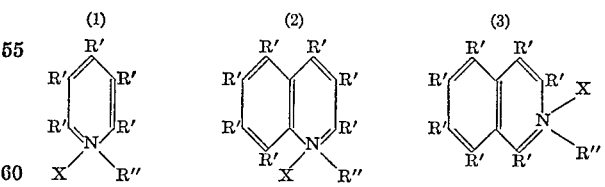

wherein R' is selected from the group consisting of hydrogen and alkyl radicals containing up to and including 6 carbon atoms; R'' is selected from the group consisting of alkyl, cycloalkyl and aryl radicals containing up to and including 20 carbon atoms; and X is a halogen.

12. In a process for polymerizing propylene in which said propylene is contacted with a catalyst prepared by admixing diethylaluminum chloride and the reaction product of aluminum and titanium tetrachloride in the substantial absence of a diluent other than said propylene at a temperature in the range of 0 to 250° F. and at a pressure in the range of 50 to 1500 p.s.i.g., the improvement comprising conducting said contacting in the presence of ethylquinolinium iodide.

13. In a process for polymerizing propylene in which said propylene is contacted with a catalyst prepared by admixing diethylaluminum chloride and the reaction product of aluminum and titanium tetrachloride in the substantial absence of a diluent other than said propylene at a temperature in the range of 0 to 250° F. and at a pressure in the range of 50 to 1500 p.s.i.g., the improvement comprising conducting said contacting in the presence of methylquinolinium chloride.

14. In a process for polymerizing propylene in which said propylene is contacted with a catalyst prepared by admixing diethylaluminum chloride and the reaction product of aluminum and titanium tetrachloride in the substantial absence of a diluent other than said propylene at a temperature in the range of 0 to 250° F. and at a pressure in the range of 50 to 1500 p.s.i.g., the improvement comprising conducting said contacting in the presence of ethylpyridinium bromide.

15. A process in accordance with claim 1 wherein said heterocyclic nitrogen compound is ethylpyridinium bromide.

16. A process in accordance with claim 1 wherein said heterocyclic nitrogen compound is methylquinolinium chloride.

No references cited.

JOSEPH L. SCHOFER, *Primary Examiner.*

WILLIAM H. SHORT, *Examiner.*